United States Patent
Gunnarsson

(10) Patent No.: US 6,895,221 B2
(45) Date of Patent: May 17, 2005

(54) PORTABLE COMMUNICATIONS UNIT

(75) Inventor: Staffan Gunnarsson, Sollentuna (SE)

(73) Assignee: Tagmaster AB, Kista (SE)

( * ) Notice: Subject to any disclaimer, the term of this patent is extended or adjusted under 35 U.S.C. 154(b) by 458 days.

(21) Appl. No.: 10/148,325

(22) PCT Filed: Nov. 29, 2000

(86) PCT No.: PCT/SE00/02375

§ 371 (c)(1),
(2), (4) Date: Aug. 13, 2002

(87) PCT Pub. No.: WO01/39103

PCT Pub. Date: May 31, 2001

(65) Prior Publication Data

US 2004/0067734 A1 Apr. 8, 2004

(30) Foreign Application Priority Data

Nov. 29, 1999 (SE) ................................. 9904314

(51) Int. Cl.⁷ ............................................... H04B 5/00
(52) U.S. Cl. ..................................... 455/41.2; 340/10.1
(58) Field of Search ............................. 455/41.1, 41.2, 455/41.3, 552.1, 553.1; 340/10.1, 505, 572.1

(56) References Cited

U.S. PATENT DOCUMENTS 5,008,661 A    4/1991  Raj ........................ 340/825.54
6,297,737 B1 * 10/2001  Irvin .......................... 340/571
6,717,516 B2 *  4/2004  Bridgelall ................ 340/572.1
2004/0069852 A1 *  4/2004  Seppinen et al. ........... 235/451

FOREIGN PATENT DOCUMENTS

WO    WO 93/16531    8/1993
WO    WO 98/16070    4/1998

* cited by examiner

Primary Examiner—Lee Nguyen
(74) Attorney, Agent, or Firm—Alfred J. Mangels

(57) ABSTRACT

A system that includes a mobile communications unit, wherein an identification module is added between a radio part and an antenna in a mobile telephone that includes a Bluetooth function. The identification module includes a mixer for transposing identification messages from identification devices in a 2.45 GHz RFID system of the backscatter type, to a baseband for further processing in the computer part of the unit and optionally communication with a superordinate system by a standard call channel or a Bluetooth channel. The unit can also send information to identification devices for alerting and/or transmitting data. Modulation and encoding can be effected in accordance with the Bluetooth standard, thereby enabling the mixer to be included as an integral part of a standard Bluetooth radio.

12 Claims, 1 Drawing Sheet

PORTABLE COMMUNICATIONS UNIT

BACKGROUND OF THE INVENTION

1. Field of the Invention

Automatic identification systems using radio/microwaves (RFID=Radio Frequency Identification) are characterized by identification devices (also designated ID tags, data carriers, cards, transponders, etc.) attached to the object to be identified and read from a remote location with the aid of a reader. The objects often pass in an ordered stream or flow, such as chassis and their manufacture in a car manufacturing plant, containers in different distribution systems, cars that have access to garages and restricted areas, people passing through highly frequented doors and passage gates, trucks in distribution centers, ports, airports and the like, railway traffic along a railroad track, and so on.

2. Description of the Related Art

A range of several meters is achieved with microwave based systems, which often operate in the bands of 915 MHz, 2.45 GHz and 5.8 GHz, which is particularly suitable for the aforementioned relatively large objects. In this regard, stationary reading units are placed adjacent the locations which the objects are expected to pass, so that identification can be effected fully automatically.

One problem, however, is that the objects do not always move in a steady stream or flow, but are parked, stopped, or take routes other than those expected. Consequently, it is desirable to obtain a compact and portable reading unit that can be readily placed in the vicinity of the object to be identified, e.g., a load carrier that awaits further transportation.

Further transportation to superordinate systems also represents a problem. A portable unit cannot, after all, simply be connected via a cable for the transfer of data from the ID devices. Similarly, if the ID device is of a programmable type, very simple transmission of data from superordinate systems to the portable unit and from there to the data carrier is desired.

Patent Application WO 93/16351 A1 provides a solution to these problems. Although this unit is portable and solves the aforesaid problems, its practical design is particularly expensive to produce. This is because the market requirement of portable units constitutes only a hundredth of the requirement for stationary units. Such units are also relatively clumsy, because the small series in which they are produced do not permit a sufficiently high integration level, i.e., discrete components are used instead of ASIC's, standard designs must be used with regard to casings, displays, keybanks, etc., and the functionality of such units is also restricted because of the lack of standards for the wireless communication with superordinate systems.

SUMMARY OF THE INVENTION

The present invention solves the aforesaid problems relating to costs, dimensions and standardization, by utilizing the so called Bluetooth technology created in the mobile telephony industry and operating at 2.45 GHz. A Bluetooth telephone is supplemented with an identification module between radio part and antenna and can therewith communicate with 2.45 GHz identification devices in a known manner.

The communication with superordinate systems is also effected with Bluetooth, should the portable unit be located within the range covered by a Bluetooth network. Such a network will normally have a range of 10–100 meters.

Alternatively, when the portable unit is not located in a Bluetooth network, said unit, which also is a mobile telephone, may be able to transmit and receive digital messages concerning identification devices via so called SMS messages with respect to a mobile telephone system according to GSM standards, alternatively according to some other standard for transmitting digital messages. This latter alternative includes all types of mobile telephone systems that can transmit digital data messages.

The Bluetooth module of the mobile telephone is supplemented with a baseband mixer for RFID between transmitter and antenna. The mixer output signal is amplified and encoded traditionally in a microprocessor, and the data is stored intermediately and sent to a superordinate system as SMS messages or the like. Corresponding writing of the data is effected by pulsating the microwave signal.

The telephone is already compact, contains few components and already has an infrastructure for communicating information with superordinate systems.

BRIEF DESCRIPTION OF THE DRAWING

The invention will now be described with reference to an exemplifying embodiment thereof and also with reference to the accompanying drawing, in which.

DESCRIPTION OF THE PREFERRED EMBODIMENTS

Figure 1:
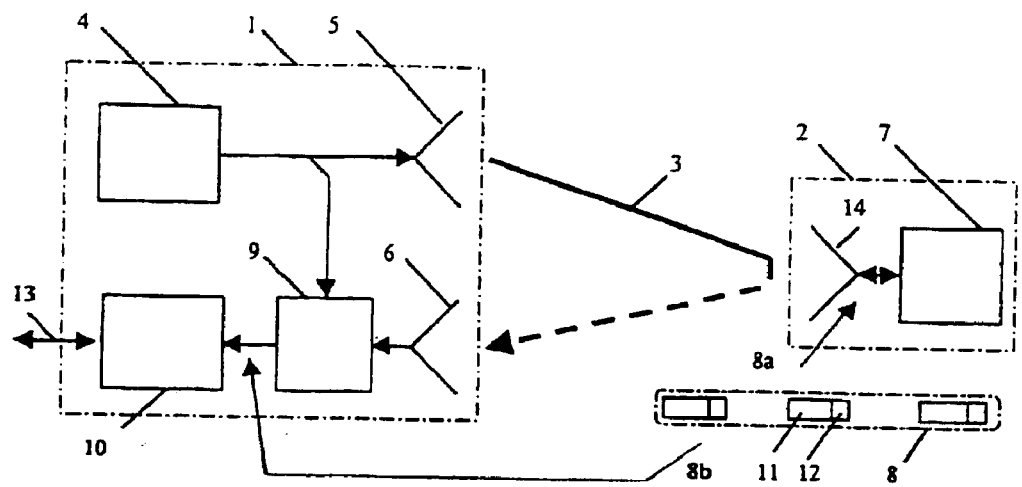
FIG. 1 illustrates an RFID system of the so-called backscatter type.

FIG. 1 illustrates a read unit 1 and an identification device 2 that interconnect via a microwave signal 3. The read unit includes a microwave oscillator 4 which irradiates the antenna 14 of the identification device via the transmitter antenna 5. The electronic unit 7 of the identification device 2 receives, encodes, modulates and reflects the signal from the read unit with information according to the data present in the electronic unit of the identification device, and therewith creates so-called identification messages 8 that are sent to the read unit.

The data content of these messages may be pre-programmed in the identification device or may be programmable, e.g., via microwaves through the medium of contact devices (not shown) or in some other way. When programming is effected via microwaves, the output signal of the microwave oscillator 4 is amplitude modulated/pulsated in accordance with the data to be transferred to the identification device 2.

The identification messages 8 are delivered to a receiver antenna 6 in the read unit. However, the receiver antenna need not necessarily be separate from the transmitter antenna 5, as in the case illustrated for the sake of simplicity, but may be incorporated in a unit that operates, e.g., in opposite polarizations, such as right/left polarization or horizontal/vertical polarization.

The microwave signal received from the identification device 2 is transposed in a mixer 9 in the read unit 1 from the antenna 6 to a baseband, by mixing the received signal with part of the signal sent by the antenna 5, so as to recreate the identification messages 8 and deliver said messages to the computer part or processor 10 of the read unit.

Data and other information contained in the identification device can therewith be made available via the communications channel 13, for instance by serial communication in accordance with some traditional method, or wireless.

Only an RFID system has been shown in the illustrated embodiment, where a non-modulated microwave signal is sent from the read unit, as may be the case when the identification device includes a constantly oscillating circuit for clocking its internal logic and its modulation circuits connected to the antenna of said identification device.

According to another embodiment, the read unit may also be used to activate the identification device, e.g. by sending pulsed microwave signals that are detected by circuits in the identification device and therewith, e.g., initiate a device-incorporated oscillator for forward clocking of data to modulator circuits in connection with the antenna of said device.

According to another embodiment, the read unit can send pulsed microwave signals for transferring data to the identification device for storage in a memory incorporated in said device and/or for controlling the function of said device. Consequently, the read unit is sometimes also called a write/read unit.

Figure 2:
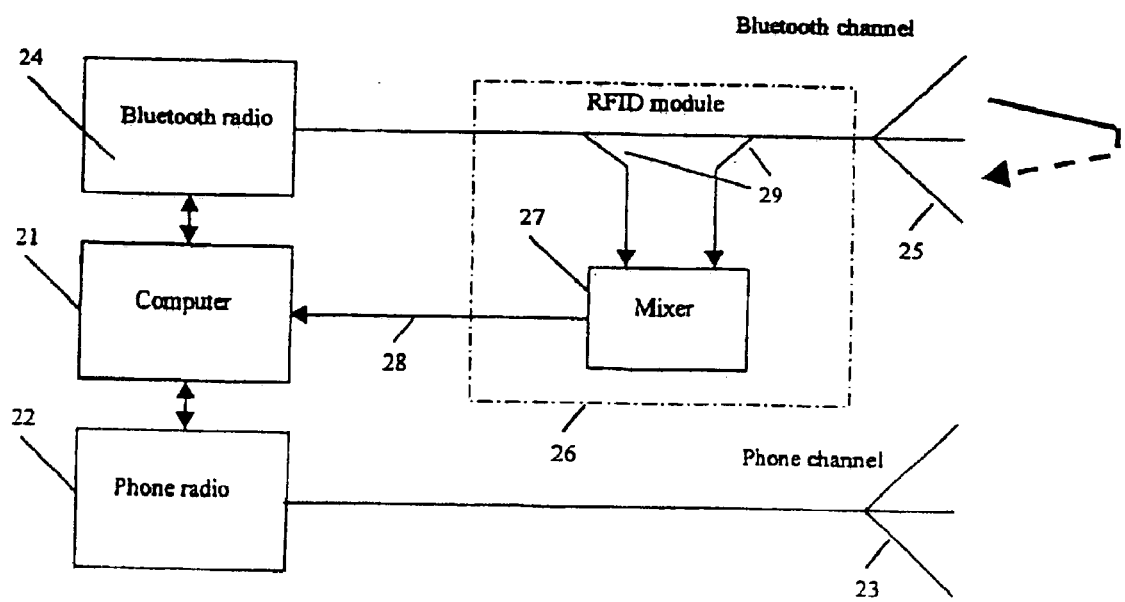
FIG. 2 shows an RFID system integrated in a mobile telephone.

FIG. 2 illustrates a write/read unit of an RFID system of the backscatter type integrated with a telephone that includes a Bluetooth channel.

The mobile telephone, which may be a GSM telephone, includes a computer part 21 which controls and co-acts with the radio part 22 used for the conventional function of the mobile telephone, i.e. communicates with the base station via the antenna 23 over a relatively large range (typically up to some kilometers), e.g., when the telephone is mounted in a vehicle, or within a building that lacks a separate base station, etc. A frequency in the order of 0.9 GHz or 1.8 GHz is often used for this communication.

Many mobile telephone operators provide services for data transmission via said links, i.e., the antenna 23 is used, for instance, to send text messages that are put through from the telephone keypad or an external PC via the computer part 21. A common service of this kind is designated SMS and the messages are referred to as SMS messages. The antenna 23 can also be used to receive text messages, e.g. for presentation in the character window of the mobile telephone or for forwarding the messages to an external PC.

FIG. 2 also shows a Bluetooth channel where a further radio part 24 is mounted for communication with external units via the antenna 25 at relatively short ranges (typically up to 100 meters). According to Bluetooth, such a supplementary channel transmits typically in the range of 2400–2480 MHz and thus overlaps the frequency band of 2450 MHz permitted for RFID and typically smaller than a bandwidth of 30 MHz. The Bluetooth radio 24 transmits at a low power output, only some milliwatts, and is thus relatively inexpensive. The cost involved is particularly low because mobile telephones are produced in very large numbers and therefore defend a high integration level, i.e. a large part of the radio 24 is integrated in one or a few ASIC's (Application Specific Integrated Circuits).

Thus, the Bluetooth radio 24 can be used, e.g., for communication with another Bluetooth radio which, however, need not necessarily be integrated in a mobile telephone. It may equally as well be integrated in a PC for the transmission of data files, or in a telephone jack for calls via the standard and line-bound telephone network.

According to this embodiment of the invention, an RFID module 26 has been included in the mobile telephone and utilizes the same radio part 24 and antenna 25 as the Bluetooth function of the mobile telephone. The addition is extremely simple and consists solely in the inclusion of a mixer 27 between the radio part 24 and the antenna 25. The information carrying signal from the Identification device is tapped-off at the junction point 29 and mixed with the transmitter signal tapped-off at the junction point 28 so as to obtain a baseband signal with identification messages obtained at 30. These messages are passed to the data part 21 of the mobile telephone and there processed in an appropriate manner. Functions for the units 10, 4, 5 and 6 in FIG. 1 are already found in the mobile telephone and the only hardware added for the RFID function is the mixer 9, i.e. the unit 27 in FIG. 2. This results in a particularly compact, useful and inexpensive mobile read unit in accordance with the invention.

If data needs to be transferred to the identification device and/or if the device requires an amplitude-modulated alert signal at 2.45 GHz. this can also be achieved. The signal from the Bluetooth radio, which already includes amplitude-modulated circuits, is then pulsated in accordance with an appropriate pattern so as to be able to write data into the device.

In one preferred embodiment of the invention, the mixer 27 is included in the standard circuits of the Bluetooth radio 24 as an integrated unit, and the portable communications unit is adapted to read identification, devices that deliver a backscatter signal according to the Bluetooth standard.

The invention also relates to an identification device that delivers its information modulated and encoded to liken the messages that are normally transmitted between different Bluetooth units, i.e. units with transmitters at both ends of the transmission link. Such an identification device is constructed for the high transmission rates in the microwave channel for which Bluetooth has been specified, as compared with the majority of RFID systems, and therefore enables power consumption to be reduced and therewith also the need for large batteries in said device. The identification device is also able to operate at a high data rate although it is also able to take a power-lean rest position between communication occasions, by virtue of having an alert facility.

The identification device may therewith also be adapted for writing in accordance with the Bluetooth standard.

What is claimed is:

1. A portable communications unit for reading and/or writing of data from and into electronic identification devices with the aid of microwaves in the 2.45 GHz band, wherein the communications unit irradiates the identification device with microwaves, and wherein the identification device reflects information to the communications unit by modulation of the incident microwave signal and without supplying further energy to the communications unit, said communications unit comprising: a mobile telephone that includes a radio unit that operates with 2.45 GHz Bluetooth technology and that includes a Bluetooth channel, a baseband mixer between the radio unit of the Bluetooth channel and an antenna, wherein the communications unit receives identification messages from said identification device.

2. A portable communications unit according to claim 1, wherein an output signal from the mixer is amplified and encoded in a computer part in the mobile telephone.

3. A portable communications unit according to claim 1, wherein data is stored and sent to a superordinate system as data messages over a standard mobile telephone speech channel.

4. A portable communications unit according to claim 3, wherein the data messages are SMS messages.

5. A portable communications unit according to claim 4, wherein the data messages are transmitted under GSM standards.

6. A portable communications unit according to claim 1, wherein data is stored and sent to a superordinate system as data messages over the Bluetooth channel of the mobile telephone.

7. A portable communications unit according to claim 1, wherein identification devices that include an alert facility are alerted by amplitude modulation/pulsating of a microwave signal sent from the Bluetooth technology radio unit.

8. A portable communications unit according to claim 1, wherein new data is written into identification devices that include a write function by the Bluetooth technology radio unit by amplitude modulation/pulsation of the transmitted microwave signal.

9. A portable communications unit according to claim 1, wherein the identification device responds to messages in the Bluetooth channel by modulation in accordance with the Bluetooth standard; and wherein the mixer is included in a standard receiver circuit of the Bluetooth technology radio unit as an integrated unit.

10. A portable communications unit according to claim 1, wherein the communications unit includes an identification device which delivers information modulated and encoded in accordance with the Bluetooth standard.

11. A portable communications unit according to claim 1, wherein the identification device operates at a high data rate and is Bluetooth compatible, and can assume a power-lean rest position between communication occasions by virtue of having an alert facility.

12. A portable communications unit according to claim 1, wherein the identification device allows data to be written thereinto in accordance with the Bluetooth standard.

* * * * *